United States Patent [19]

Machida et al.

[11] Patent Number: 4,490,752
[45] Date of Patent: Dec. 25, 1984

[54] ROTARY RECORDING MEDIUM HAVING A SELECTIVELY REPRODUCIBLE CONTINUOUS STREAM OF AUDIO SIGNALS RECORDED THEREON AND REPRODUCING APPARATUS THEREFOR

[75] Inventors: Toyotaka Machida, Kashiwa; Hitoshi Aoike, Nagareyama, both of Japan

[73] Assignee: Victor Company of Japan, Ltd., Yokohama, Japan

[21] Appl. No.: 363,795

[22] Filed: Mar. 31, 1982

[30] Foreign Application Priority Data

| Apr. 1, 1981 [JP] | Japan | 56-48925 |
| Apr. 1, 1981 [JP] | Japan | 56-48926 |

[51] Int. Cl.³ .............................................. H04N 5/76
[52] U.S. Cl. ................................... 358/342; 358/343; 358/907
[58] Field of Search ............... 358/312, 342, 343, 346, 358/907; 360/10.1, 10.2, 19.1

[56] References Cited

U.S. PATENT DOCUMENTS

| 4,065,794 | 12/1977 | Shutterly | 360/19.1 |
| 4,090,218 | 5/1978 | van Buul et al. | |
| 4,138,741 | 2/1979 | Hedlund et al. | 358/342 |
| 4,353,090 | 10/1982 | Broadbent | 358/342 |
| 4,361,849 | 11/1982 | Bolger | 358/312 |
| 4,393,489 | 7/1983 | Mehrotra | 358/342 |
| 4,402,018 | 8/1983 | Wada et al. | 358/342 |

FOREIGN PATENT DOCUMENTS

| 1155476 | 10/1963 | Fed. Rep. of Germany . |
| 2,809,490 | 9/1978 | Fed. Rep. of Germany . |

Primary Examiner—Donald E. McElheny, Jr.
Attorney, Agent, or Firm—Louis Bernat

[57] ABSTRACT

A rotary recording medium is repeatedly recorded with a video signal of the same unit for a plurality of field periods in each track turn, and divided audio signal parts obtained by dividing an audio signal in units of field periods of the video signal which is to be reproduced are successively arranged and recorded on a recording track of the video signal according to a tracing locus or a reproducing element on the rotary recording medium upon normal reproduction during which change of track is performed by forcibly shifting the reproducing element at least once or a plurality of times for two revolution periods of the rotary recording medium. A rotary recording medium reproducing apparatus comprises a reproducing circuit for picking up and reproducing recorded signals from the above rotary recording medium, and a shifting circuit applied with a discrimination signal in accordance with the type of the rotary recording medium and a reproduction mode signal in accordance with a reproduction mode, for shifting the tracing locus of the reproducing element so as to reproduce a video signal of video and audio signals of a reproduction mode specified by the reproduction mode signal.

11 Claims, 16 Drawing Figures

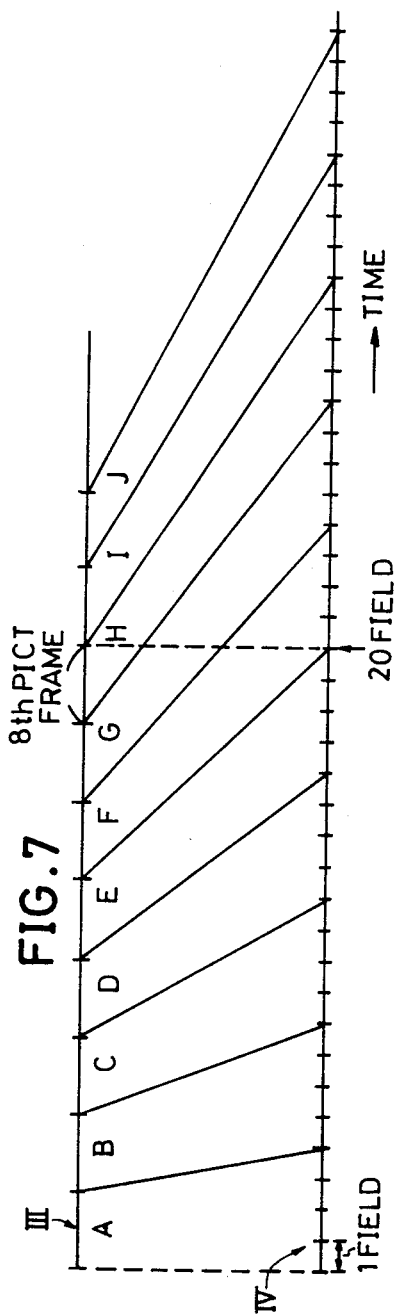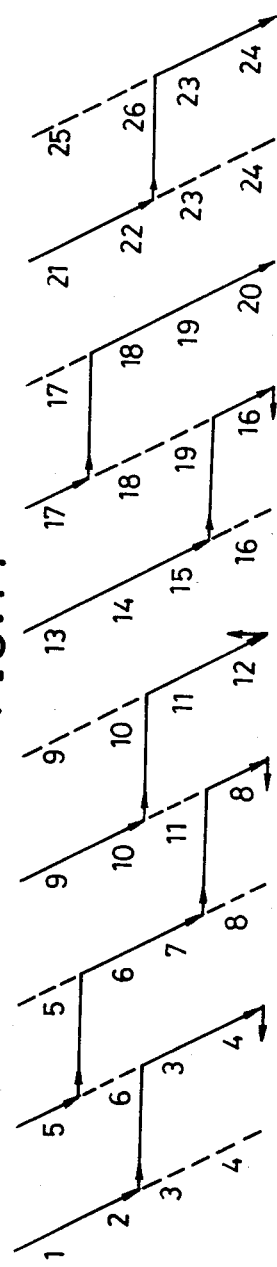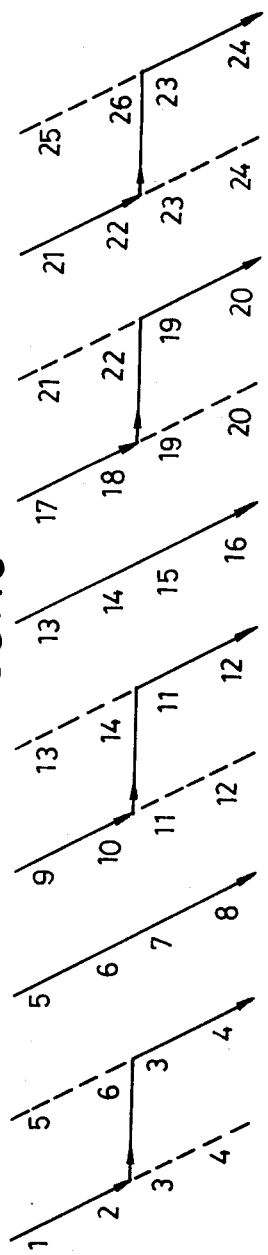

ROTARY RECORDING MEDIUM HAVING A SELECTIVELY REPRODUCIBLE CONTINUOUS STREAM OF AUDIO SIGNALS RECORDED THEREON AND REPRODUCING APPARATUS THEREFOR

BACKGROUND OF THE INVENTION

The present invention generally relates to rotary recording medium and reproducing apparatus therefor, and more particularly to a rotary recording medium and a reproducing apparatus therefor, with which a fine and stable still picture can be obtained during a still picture reproduction mode, and video and audio signals can be reproduced without introducing inconveniences during a normal reproduction mode.

An information signal recording and reproducing system has been previously proposed in which the recording system forms pits in accordance with the information signal to record the information signal along a spiral track on a flat rotary recording medium (hereinafter simply referred to as a disc), without forming a groove therein. In the reproducing system, a reproducing stylus traces over along this track to reproduce the recorded information signal in response to variations in the electrostatic capacitance formed between a reproducing stylus and the disc.

In this previously proposed system, since no grooves are provided on the disc for guiding the reproducing stylus, it becomes necessary to record pilot or reference signals on or in the vicinity of a track of the information signal such as a video signal, on the disc. Upon reproduction, the reference signals are reproduced together with the video signal. Tracking control is carried out so that the reproducing stylus accurately traces along the track in response to the reproduced reference signals.

By use of this previously proposed system, there is no possibility whatsoever of the reproducing stylus or the disc being damaged, since the recording track has no groove. The reproducing stylus can trace the same portion of the track repeatedly many times, whereby a special reproduction such as still, slow-motion, or quick-motion picture reproduction becomes possible.

In the above type of a disc, a standard is set for the above proposed system so that four fields of video signal is recorded for one track turn of the disc. This standard was set in order to increase the recording capacity under the restricting conditions introduced by the practical diameter and rotational speed of the disc, the relative linear speed between the reproducing stylus and the disc for obtaining a fine signal-to-noise (S/N) ratio, and the like.

When a still picture reproduction is performed with the above disc, the same track turn is reproduced repeatedly. Accordingly, the video signal of four fields is repeatedly reproduced in this case, to perform the still picture reproduction. However, especially when the movement in the picture which is to be reproduced is fast, the picture content in the first field of the video signal substantially differ from the picture content in the fourth field. Hence, a complete still picture cannot be obtained in this case, and the reproduced picture becomes unstable and unpleasant to watch.

In order to overcome the above described problems, a method may be considered in which the same video information content, that is, the content of the first field is recorded throughout the four fields in the one track turn. By this method, the content of the fifth field is recorded throughout the four fields in the succeeding track turn. Similarly, every fourth field is recorded throughout one track turn. In this case, even when the same track turn is repeatedly reproduced, the same field is repeatedly reproduced, and a complete and stable still picture can be obtained.

However, if a normal reproduction is performed with respect to the disc recorded in the above described manner, ¾ of the picture information is dropped out, and the information content of the first, fifth, ninth, ... fields are successively reproduced in units of four fields. Therefore, the movement in the picture which is reproduced becomes unstable and irregular.

SUMMARY OF THE INVENTION

Accordingly, it is a general object of the present invention to provide a novel and useful rotary recording medium and reproducing apparatus therefor, in which the above described disadvantages have been overcome.

Another and more specific object of the present invention is to provide a rotary recording medium repeatedly recorded with a video signal of the same unit for a plurality of field periods in each track turn, and in which divided audio signal parts obtained by dividing an audio signal in units of field periods of the video signal which is to be reproduced are successively arranged and recorded on a recording track of the video signal according to a tracing locus of a reproducing element on the rotary recording medium upon normal reproduction during which change of track is performed by forcibly shifting the reproducing element at least once or a plurality of times for two revolution periods of the rotary recording medium. According to the rotary recording medium of the present invention, a complete and stable still picture reproduction can be performed. Moreover, the video and audio signals can be reproduced without introducing inconveniences even during normal reproduction.

Still another object of the present invention is to provide a rotary recording medium reproducing apparatus for reproducing the rotary recording medium recorded with the signals in the above described manner. According to the reproducing apparatus of the present invention, reproduction is performed so that a complete and stable still reproduced picture is obtained during a still picture reproduction mode, and reproduction is performed so that the video and audio signals can be reproduced without introducing inconveniences during a normal reproduction mode.

Other objects and further features of the present invention will be apparent from the following detailed description when read in conjunction with the accompanying drawings.

BRIEF DESCRIPTION OF THE DRAWINGS

FIG. 7 shows a time relationship between a video signal which is to be recorded onto the disc shown in FIG. 6 and a video signal recorded on this disc;

FIGS. 14 and 15 respectively diagrammatically show the relationship between the track tracing locus and the divided audio signal part when normal reproduction is performed with respect to the disc shown in FIG. 6.

DETAILED DESCRIPTION

Figure 1:
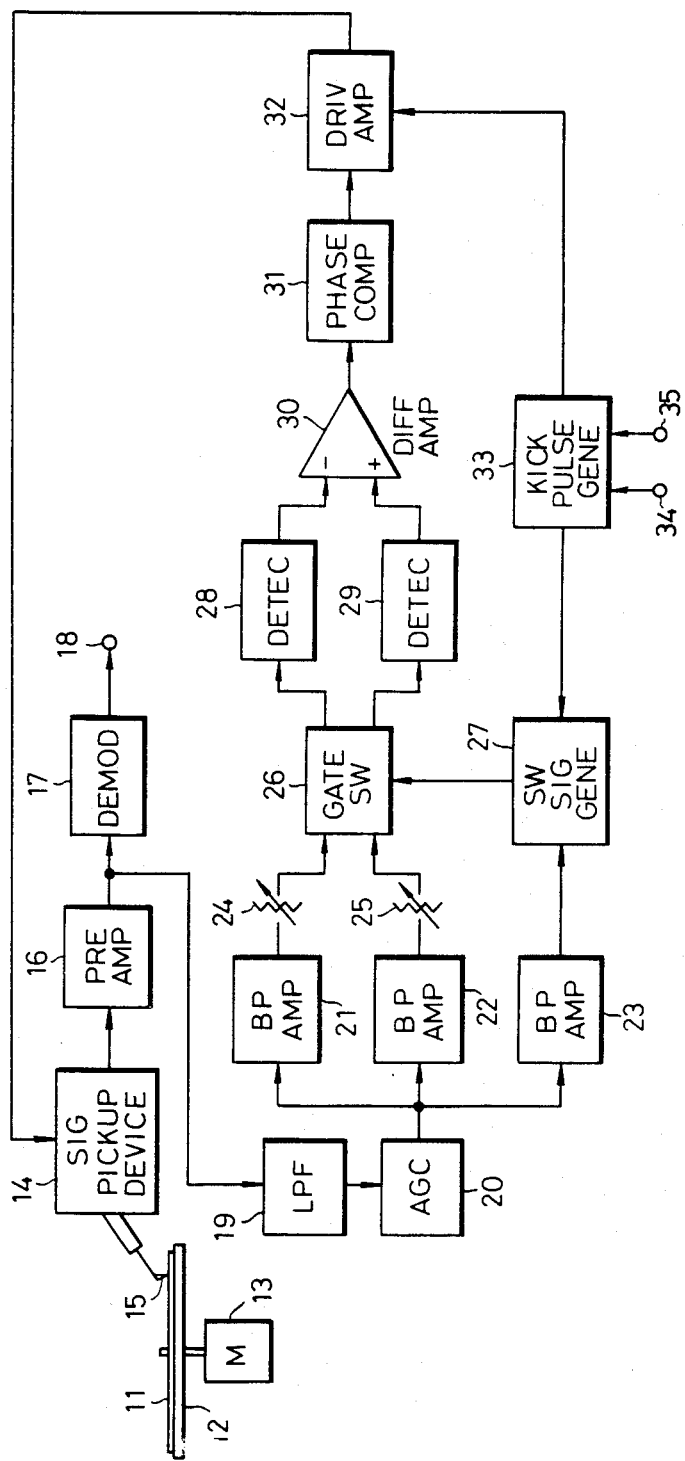
FIG. 1 is a systematic block diagram showing an embodiment of a rotary recording medium reproducing apparatus according to the present invention.

In FIG. 1, a rotary recording medium (hereinafter simply referred to as a disc) 11 is placed onto a turntable 12, and rotated by a motor 13 at a rotational speed of 900 rpm, for example. A signal pickup device 14, used as a reproducing transducer, has a reproducing stylus 15, and moves continuously and linearly in a direction from the outer peripheral part to the inner peripheral part at a speed equal to the distance of one track pitch per revolution of the turntable 12, during a forward normal reproduction mode. Accordingly, the stylus 15 of the signal pickup device 14 travels radially across the rotating disc 11 and relatively traces the spiral track of the disc 11.

Figure 2:
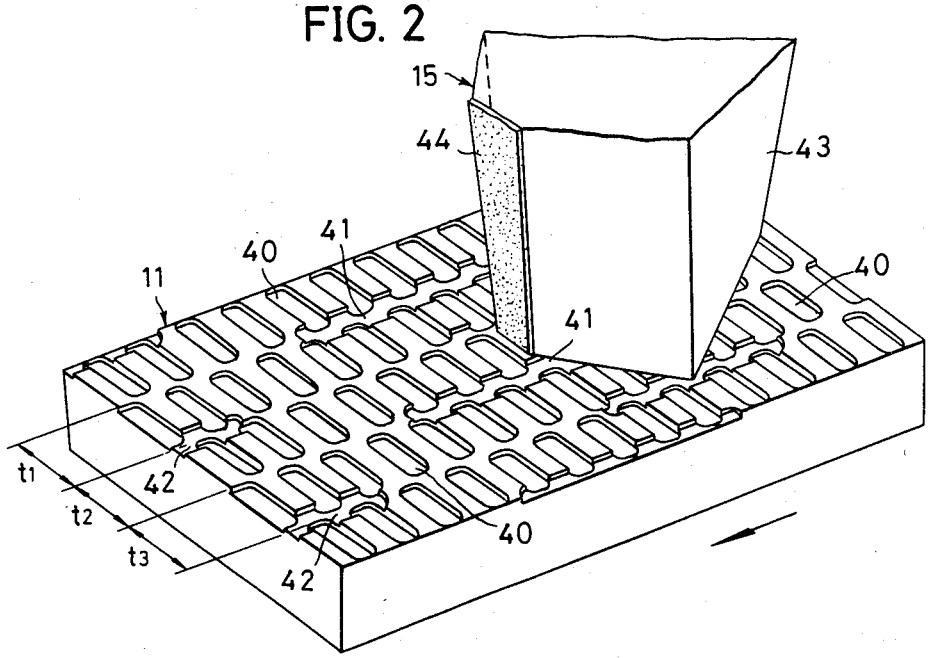
FIG. 2 is a perspective view, in an enlarged scale, showing a part of a disc together with a tip end part of a reproducing stylus.

A main information signal comprising a video signal and an audio signal is recorded on a spiral track with pits formed on the disc 11 according to the information contents of the signal. One part of this track is shown in an enlarged scale in FIG. 2. In FIG. 2, track turns of a single continuous spiral track, corresponding to each revolution of the disc 11, are designated by t1, t2, t3, . . . . Each track turn is constituted by the formation of pits 40 of a main information signal along a plane track path and has no stylus guide groove formed therein. With respect to one track turn t1, in every horizontal scanning period (H) at a position corresponding to the horizontal blanking period, pits 41 of a first reference signal fp1 are formed on one lateral side of the track as viewed in the track path direction. Pits 42 of a second reference signal fp2 are formed on the other side of the track.

At an intermediate position between the centerlines of adjacent track turns, only pits of either one kind of the pits 41 and 42 of the above reference signals fp1 and fp2 are formed, and moreover, with respect to one track, the sides on which the pits 41 and 42 are formed are alternated for every track turn. That is, if the pits 41 and 42 are respectively formed on the right and left sides of one track turn, for example, the pits 42 and 41 will respectively be formed on the right and left sides of each of the adjacent track turns.

The tip end of the reproducing stylus 15 has a shape shown in FIG. 2. The reproducing stylus 15 is constituted by a stylus structure 43 having a disc tracing surface which has a width greater than a track width, and an electrode 44 fixed to the rear face of the stylus structure 43. As the reproducing stylus 15 traces along a track on the disc 11 rotating in a direction indicated by an arrow, the main information signal recorded thereon by the formation of pits is reproduced as variations in the electrostatic capacitance between the surface of the disc 11 and the electrode 44 of the reproducing stylus 15.

Figure 3:
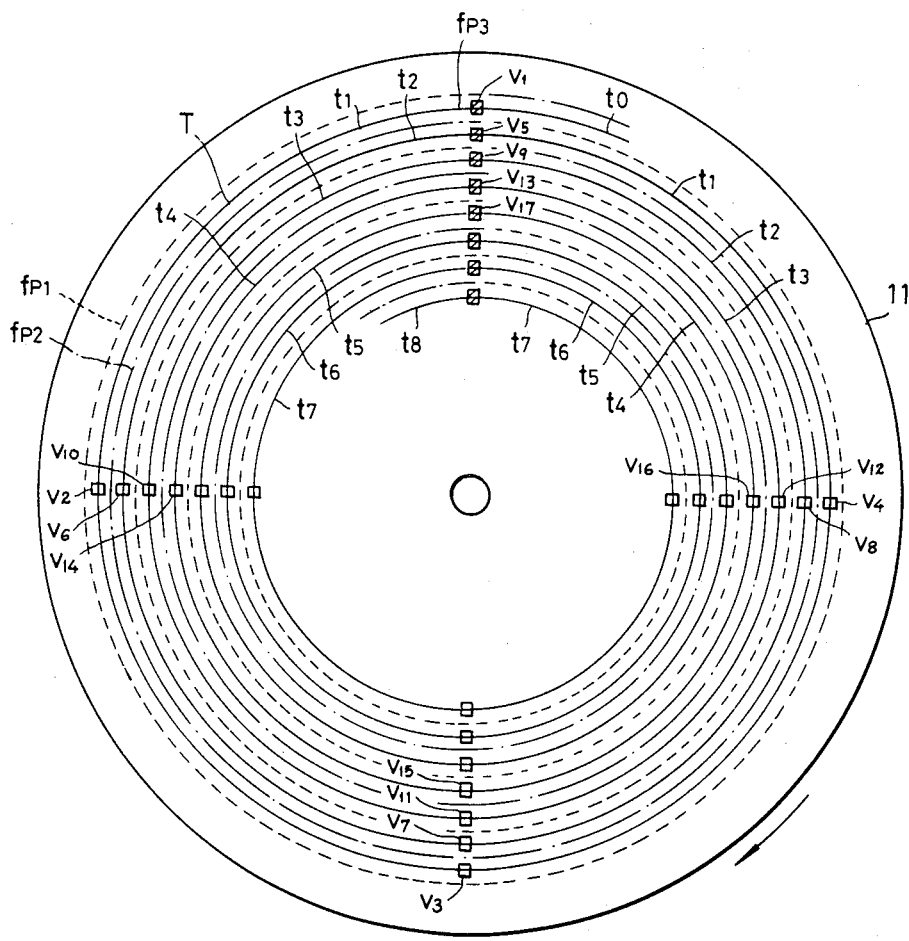
FIG. 3 shows a track pattern on a disc.

On the disc 11, as indicated in FIG. 3, the main information signal is recorded along a spiral track T for four fields, for one revolution of the disc. In FIG. 3, the tracks of the reference signal fp1 is shown by dotted lines while the reference signal fp2 is shown by one-dot chain lines. The positions of the vertical synchronizing signals of respective fields are designated by reference characters V1, V2, V3, . . . , and the successive track parts corresponding to one revolution of the disc of a single spiral track T is designated by track turns t1, t2, t3, . . . . Furthermore, a third reference signal fp3 is recorded at the starting end positions V1, V5, V9, . . . of each of the track turns t1, t2, t3, . . . , that is, at positions where the reference signals fp1 and fp2 change over.

In the system shown in FIG. 1, a reproduced signal picked up from the disc 11 as minute variations in the electrostatic capacitance by the reproducing stylus 15 of the signal pickup device 14, is supplied to a preamplifier 16 having a resonant circuit. The resonance frequency of the resonant circuit varies in response to this variation in the electrostatic capacitance, and is formed into a signal of a desired level. The resulting output of the preamplifier 16, is demodulated into the original main information signal by a demodulator 17 and is obtained as an output through an output terminal 18.

The output signal of the preamplifier 16 is supplied to a lowpass filter 19 wherein the reference signals fp1, fp2, and fp3 are separated. The output reference signals pass through an automatic gain control circuit 20, and are respectively supplied to amplifiers 21, 22, and 23. Here, each of the amplifiers 21, 22, and 23 is a kind of a bandpass amplifier respectively designed to have steep passing frequency characteristics at only the respective frequency fp1, fp2, and fp3. As a result, the signals having frequencies fp1 and fp2 are respectively separated and obtained from the amplifiers 21 and 22. These signals respectively pass through level adjustors 24 and 25, wherein the levels of the signals are adjusted. The resulting signals are then supplied to a gate switching circuit 26. The reference signal fp3 separated and amplified at this bandpass amplifier 23, is supplied to a switching signal generating circuit 27. The gate switching circuit 26 performs switching of the reference signals fp1 and fp2 every one revolution period of the disc 11 upon normal reproduction, in response to the switching signal generated by the switching signal generating circuit 27 which is applied thereto. Hence, due to the switching signal which reverses polarity every two frames (1/15 seconds), the signals fp1 and fp2 are always alternately supplied to detecting circuits 28 and 29 from the gate switching circuit 26.

The detecting circuits 28 and 29 detect the envelopes of their respective input reference signals, and convert the input reference signals into DC voltages. These DC voltages are then supplied to a differential amplifier 30. The differential amplifier 30 compares the output signals of the two detecting circuits 28 and 29 which vary in response to the reproduced levels of the reference signals fp1 and fp2, and generates an output tracking error signal which indicates the direction of the tracking error and the error quantity. This tracking error signal passes through a phase compensation circuit 31 and is further amplified to a specific level by a driving amplifier 32.

In the recording system (not shown), the recorded audio signal is frequency-modulated and then mixed and multiplexed with the video signal. The audio signal which is to be recorded is divided into units of one field period, and the divided audio signal is re-arranged in a predetermined order and composed in a time-series manner, as will be described hereinafter, before being recorded onto a magnetic tape. The signal reproduced from this magnetic tape is used as the recorded audio signal. A magnetic recording and reproducing apparatus (video tape recorder), a television camera, movie films, and the like can be used as the source of the above video signal. The recorded audio signal is frequency-modulated so that the audio signal exists in a frequency band higher than that of the video signal. The above mixed and multiplexed signal is frequency-modulated, and this frequency-modulated mixed and multiplexed signal is recorded onto the track T of the disc 11 as the main information signal. The recording of the main information signal is performed by a recording system such as that disclosed in the U.S. Pat. No. 4,315,283.

The video signal recorded onto the disc 11 is a video signal of the same field or the same picture frame for one revolution of the disc. However, the recording method of the audio signal depends on the kind of video signal and video signal source. Hence, description will be given hereinafter with respect to each case.

Figure 4:
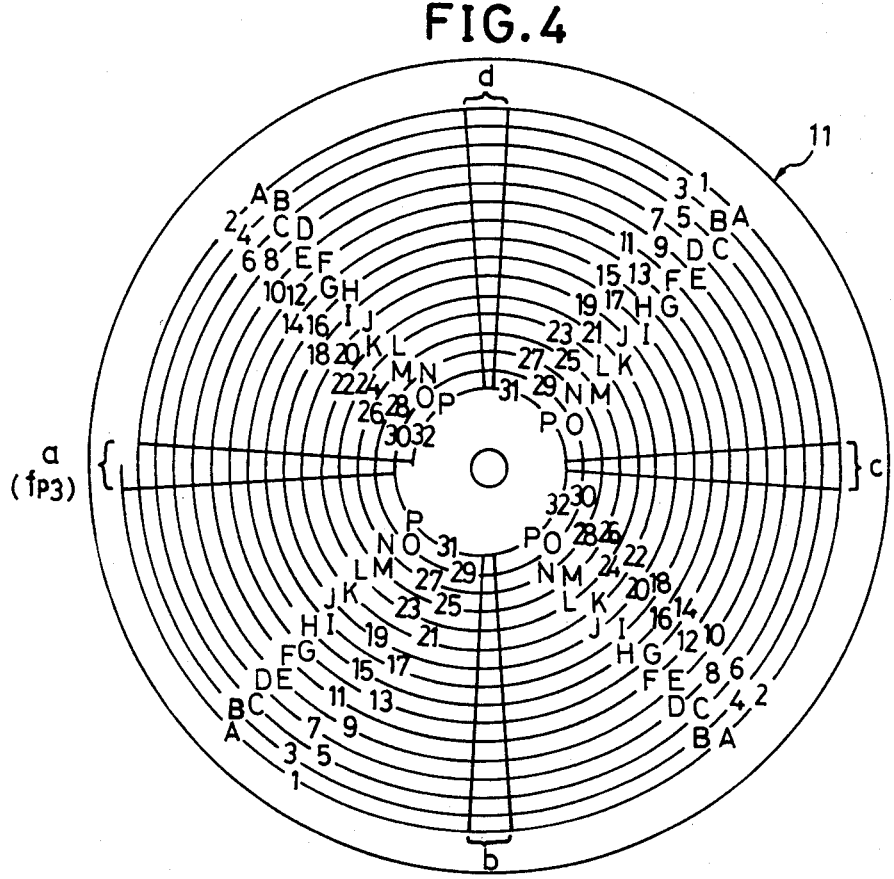
FIG. 4 shows a track pattern for explaining the recorded signal content of a first embodiment of a disc according to the present invention.
Figure 5:
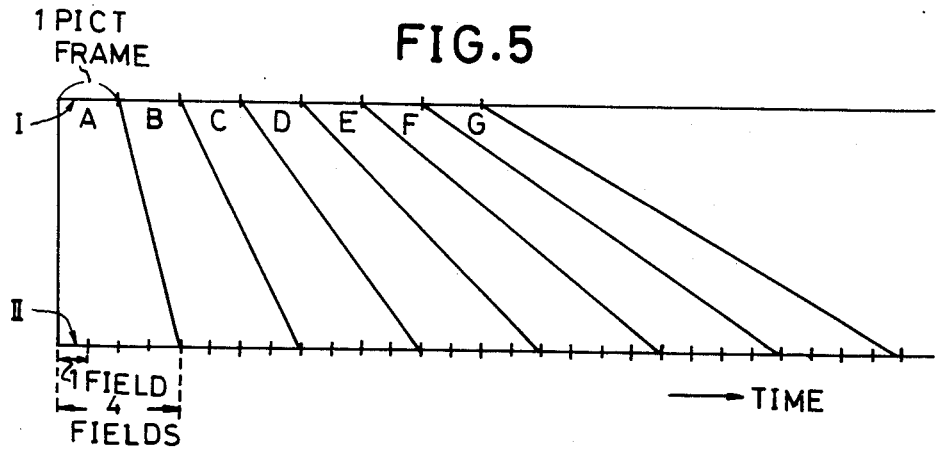
FIG. 5 shows a time relationship between a video signal which is to be recorded onto the disc shown in FIG. 4 and a video signal recorded on this disc.

First, description will be given for a case where a video signal from a movie film having twenty-four picture frames per second, is recorded onto the disc as a video signal having a field frequency of 50 Hz. FIG. 4 diagrammatically shows the recorded position and order of the video and audio signals, in a first embodiment of a disc according to the present invention for this case. In FIG. 4, reference alphabets A, B, . . . , O, and P indicate the order of the picture frame of the movie film, and numbers indicated beside these reference alphabets indicate the divided order of each divided audio signal part divided in units of field periods. The positions where these numbers appear, indicate the recorded positions of these divided audio signal parts. That is, as indicated by a straight line I in FIG. 5, the video signal of each picture frame is successively reproduced from the movie film in an order A, B, C, D, E, . . . . However, as indicated by a straight line II in FIGS. 4 and 5, the video signal of the same picture frame is recorded onto the disc during one revolution period of the disc (that is, four-field period). Similarly, the video signal of succeeding picture frames are successively recorded in units of one revolution period of the disc. As shown in FIG. 5, one picture frame of the video signal from the movie film is reproduced in 1/24 seconds. On the other hand, in one track turn of the disc, the video signal of one picture frame is repeatedly recorded every 1/50 second for one field, for a total of four times per track turn.

With respect to the audio signal, the divided audio signal parts are composed in a time-series manner and successively recorded in an order 1, 2, 1, 2, 3, 4, 3, 4, 5, 6, . . . for every ¼ revolution of the disc (every one-field period), in the embodiment shown in FIG. 4. The audio signal should actually be reproduced so that the divided audio signal parts are reproduced with the same order as the divided order 1, 2, 3, 4, 5, 6, . . . . However, the order of the divided audio signal parts are re-arranged from the original order as described above upon recording. This is to ensure that the audio signal is reproduced in the original order upon reproduction, since the reproducing stylus is forcibly shifted by one track during normal reproduction in the reproducing apparatus. More detailed description will be given hereinafter.

In FIG. 4, a, b, c, and d respectively indicate recorded parts corresponding to vertical blanking periods of the video signal. The third reference signal fp3 is recorded within a predetermined interval at a part of the vertical blanking period recorded part a. Moreover, the recorded positions of the reference signals fp1 and fp2 are omitted in FIG. 4, since these positions were shown in FIG. 3. The arrangement of the divided audio signal parts are selected so that the audio signal is reproduced in the original order, even when the reproducing stylus is shifted at an erroneous position. The order in which the divided audio signal parts are arranged, is not limited to the embodiment shown in FIG. 4. For example, the divided audio signal parts may be arranged in an order 1, 2, 3, 4, 1, 2, 3, 4, 5, 6, 3, 4, . . . .

Next, description will be given with respect to a disc according to the present invention, for a case where the video signal source is a video tape recorder (VTR) or a television camera, and the disc is recorded with a reproduced (picked up) video signal having a field frequency of 50 Hz. In this case, only the odd or even number fields of the reproduced video signal from the VTR or the video signal from the television camera, are recorded. For example, if the odd number fields of the reproduced video signal are recorded, the first field of the reproduced video signal is recorded for one revolution period of the disc (four-field period). The third field of the reproduced video signal is recorded for the succeeding one revolution period of the disc. Similarly, the odd number fields, that is, the fifth, seventh, . . . , fields of the reproduced video signal are successively recorded for one revolution period of the disc. One revolution period of a disc rotating at a rotational speed of 750 rpm is 4/50 seconds. However, the reproduced video signal from the VTR or the video signal from the television camera, which is to be recorded, has one-field period equal to 1/50 seconds. Thus, the same field of the reproduced video signal is repeatedly recorded four times during one revolution period of the disc.

On the other hand, with respect to the audio signal, each divided audio signal part is recorded in a time-series manner with a similar order of arrangement as in the above first embodiment of the invention, since the reproducing stylus is shifted in a similar manner as in the above first embodiment during the normal reproduction mode. Accordingly, the order with which the recorded video signal and audio signal on the disc are arranged, becomes as shown in FIG. 4 as in the above first embodiment, where the video signal from the VTR and the like having the field frequency of 50 Hz and the audio signal are recorded together on the same track.

In a case where a video signal having a field frequency of 60 Hz obtained from the VTR or the television camera, is to be recorded onto the disc at a rate of four fields for one revolution period of the disc, the odd or even number fields of the reproduced video signal are successively recorded for every one revolution period of the disc as in the above described case. However, the rotational speed of the disc becomes equal to 900 rpm in this case. In addition, when recording a video signal from a movie film, where thirty picture frames of the movie film are reproduced per second, one picture frame of the video signal is repeatedly recorded four times for one revolution period of the disc, as in the above described case. Such a disc is rotated at a rotational speed of 900 rpm. The order with which the recorded video signal and the audio signal are arranged on the disc, becomes the same as that shown in FIG. 4. This is because the track tracing locus of the reproducing stylus is the same as in the first embodiment of the invention during the normal reproduction mode, as will be described hereinafter.

Figure 6:
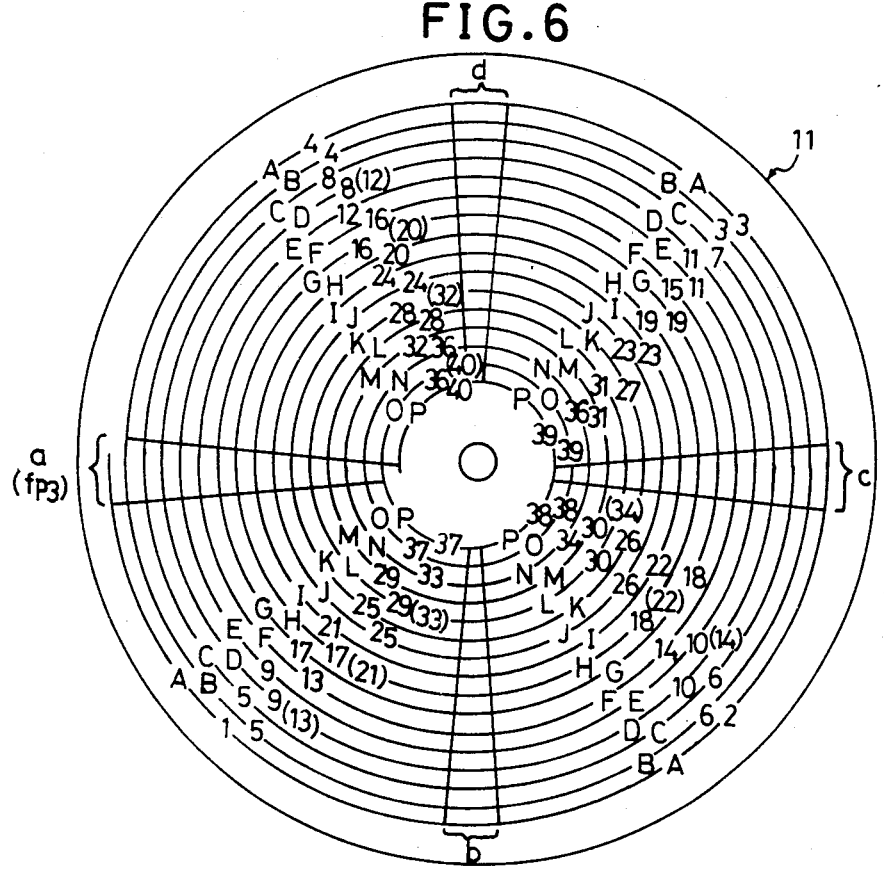
FIG. 6 shows a track pattern for explaining the recorded signal content of a second embodiment of a disc according to the present invention.
Figure 8:
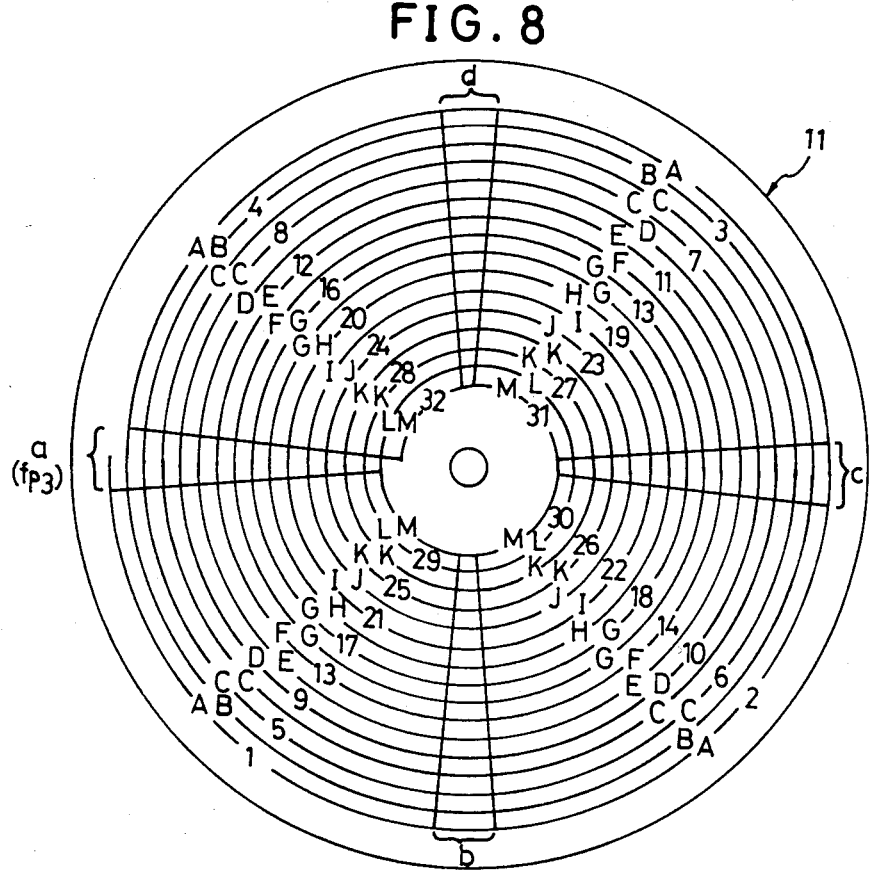
FIG. 8 shows a track pattern for explaining the recorded signal content of a third embodiment of a disc according to the present invention.

Next, description will be given for a case where a video signal from a movie film having twenty-four picture frames per second, is recorded onto the disc as a video signal having a field frequency of 60 Hz. FIG. 6 diagrammatically shows the recorded position and order of the video and audio signals in a second embodiment and its modification of a disc according to the present invention. In FIG. 6 and FIG. 8 which will be described hereinafter, the reference alphabets indicate the order of the picture frame of the recorded video signal, as in the case of FIG. 4. Furthermore, the numbers indicate the divided order of each divided audio signal part which is divided in units of field periods. Moreover, numbers indicated in brackets in FIG. 6 indicate the order of the divided audio signal parts, in the modification of the second embodiment of the invention which will be described hereinafter.

As diagrammatically shown in FIG. 7, each picture frame of the video signal from the above movie film is successively reproduced in an order A, B, C, D, E, ... as indicated along a straight line III. This video signal is successively recorded onto the disc with a rate of one picture frame for one revolution period of the disc. That is, as shown in FIG. 6, a picture frame A of the video signal is recorded onto a track on the outer peripheral side of the track formed during one revolution period of the disc. During a succeeding one revolution period of the disc, a picture frame B of the video signal is recorded onto the disc. Similarly, picture frames C, D, E, F, ... of the video signal are successively recorded onto the disc for each of the succeeding one revolution period of the disc.

One picture frame of the video signal from the movie film is reproduced in 1/24 seconds. In the present embodiment of the invention, one revolution period of the disc is 1/15 seconds, which is equal to four-field period of a video signal having a field frequency of 60 Hz. Hence, as shown in FIG. 7, one picture frame of the video signal from the movie film is repeatedly recorded every 1/60 seconds which is a time period shorter than the reproducing time of 1/24 seconds, and accordingly recorded for a total of four times for one revolution period of the disc. In FIGS. 6 and 8, a, b, c, and d respectively indicate the vertical blanking period recorded parts of the video signal. The third reference signal fp3 is recorded at a part within the vertical blanking period recorded part a.

On the other hand, the audio signal is divided into units of one-field period. As shown in FIG. 6, each divided audio signal part is arranged and recorded in an order 1, 2, 3, 4, 5, 6, 3, 4, 5, 6, 7, 8, 9, 10, 11, 8, 9, 10, 11, 12, 13, 14, 15, 16, 17, 18, .... These divided audio signal parts should actually be reproduced in an order 1, 2, 3, 4, 5, 6, 7, .... However, these divided audio signal parts are recorded in the above described manner so that a normal reproduced picture can be obtained during a normal reproduction mode as will be described hereinafter, and so that these divided audio signal parts can successively be reproduced with the original order. The order with which the divided audio signal parts are arranged, can also be changed with those indicated in brackets in FIG. 6.

Figure 9:
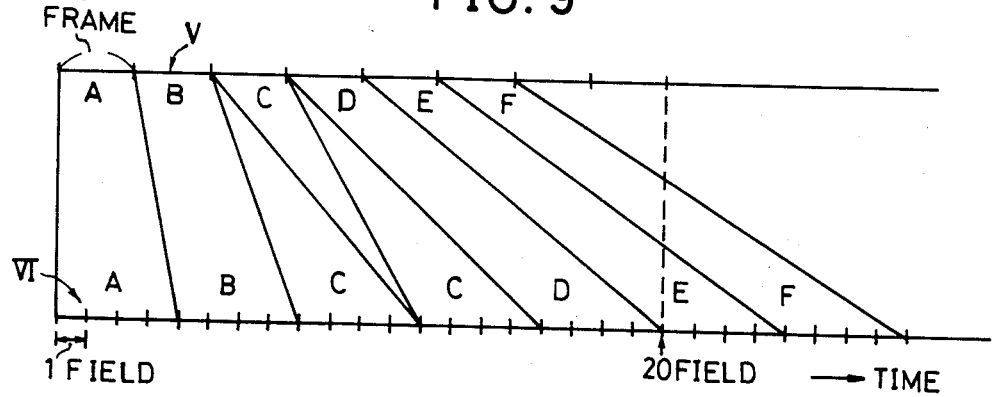
FIG. 9 shows a time relationship between a video signal which is to be recorded onto the disc shown in FIG. 8 and a video signal recorded on this disc.

FIG. 8 diagrammatically shows the recorded position and order of the video and audio signals, in a third embodiment of a disc according to the present invention. FIG. 9 shows a corresponding time relationship between the video signal from the movie film having twenty-four picture frames per second which is to be recorded onto the disc, and the video signal recorded on the disc. The video signal from the above movie film has picture frames arranged in an order A, B, C, D, E, ... as shown along a straight line V in FIG. 9. The picture frames A, B, and D of the video signal are repeatedly recorded for four fields per track turn of the disc. However, as shown along a straight line IV in FIG. 9, the picture frame C of the video signal is repeatedly recorded for eight fields, that is, for two track turns of the disc. Hence, as shown in FIG. 8, picture frames C, G, and K of the video signal are repeatedly recorded for a total of eight fields for two track turns of the disc, while other picture frames of the video signal are repeatedly recorded for four fields per track turn of the disc. Moreover, the divided audio signal parts are successively arranged and recorded on a track tracing locus obtained upon normal reproduction, as shown in FIG. 8.

Next, description will be given with respect to the operation of a reproducing apparatus according to the present invention for reproducing the above described disc. In FIG. 1, a kick pulse generator 33 generates a kick pulse with a predetermined timing, even during normal reproduction. The kick pulse generator 33 has an input terminals 34 and 35. A disc discriminating signal is applied to the input terminal 34 when the disc according to the present invention is loaded into the reproducing apparatus. This disc discriminating signal can be obtained in the following manner, for example. A cutout is provided at a predetermined position at the front end part of a lid of a disc case which accommodates the disc 11. If the disc case is inserted into and then extracted from the reproducing apparatus, the disc can be placed onto the turntable without directly handling the disc. Micro-switches are provided at the innermost part of the reproducing apparatus, opposing the front end part of the lid which is held within the reproducing apparatus together with the disc. Hence, the above disc discriminating signal can be obtained by turning OFF a micro-switch opposing the above cutout, and by turning ON the other micro-switch by pushing this other micro-switch with the front end part of the lid. The disc discriminating signal can also be obtained by other methods, such as recording the disc discriminating signal at the outer peripheral side of the disc or recording track number codes on the disc. Furthermore, the operator may discriminate the disc through a discriminating code printed on the disc case and the like, so as to obtain the disc discriminating signal through an input device.

On the other hand, a reproduction mode signal is applied to the input terminal 35. That is, if a discriminating signal for the disc according to the present invention is applied to the input terminal 34 and a still picture reproduction mode signal is applied to the input terminal 35, the kick pulse generator 33 generates a kick pulse for forcibly shifting the reproducing stylus 15 towards the outer peripheral side of the disc by one track pitch, for every revolution of the disc 11. This kick pulse is applied to a tracking coil in the signal pickup device 14 through the driving amplifier 32, and also applied to the switching signal generating circuit 27. When the disc discriminating signal is supplied to the input terminal 34 and a normal reproduction mode signal is supplied to the input terminal 35, the kick pulse generator 33 generates a kick pulse with a predetermined timing.

Next, detailed description will be given with respect to the operation of the reproducing apparatus, for the above two cases, that is, during the still picture reproduction mode and the normal reproduction mode. First, when the disc 11 is a disc such as the first embodiment shown in FIG. 4, the reproducing stylus 15 is shifted towards the outer peripheral side of the disc by one track pitch every time the third reference signal fp3 is reproduced, during the still picture reproduction mode. Hence, in this case, the reproducing stylus 15 repeatedly reproduces the same track on the disc. In this embodiment of the invention, a complete and stable still reproduced picture can be obtained during the still picture reproduction mode, since the same picture frame (or field) of the video signal is recorded throughout the one revolution period of the disc (or one track turn of the disc). During the still picture reproduction mode, the audio signal is normally not reproduced.

Figure 10:
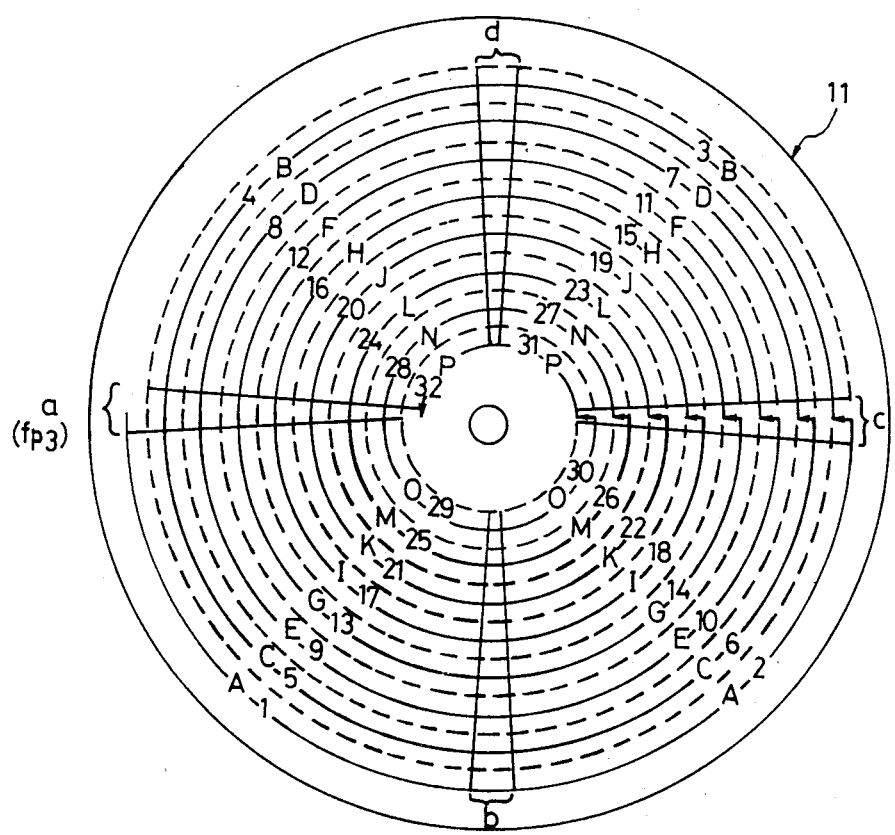
FIG. 10 shows an example of a track tracing locus when a normal reproduction is performed with respect to the disc shown in FIG. 4 or FIG. 8.

Description will now be given for a case where normal reproduction is performed with respect to the disc shown in FIG. 4. The disc shown in FIG. 4 is recorded with a video signal from a movie film which is reproduced at a rate of twenty-four picture frames per second. In order to reproduce the above video signal as a video signal having a field frequency of 50 Hz, it becomes necessary to use the known 2—2 pull-down system in which one picture frame of the video signal is successively reproduced in units of two fields. Thus, the kick pulse generator 33 generates a kick pulse so that the reproducing stylus 15 traces along a main track tracing locus indicated by a solid line in FIG. 10. That is, during normal reproduction, the reproducing stylus 15 is kicked towards the inner peripheral side of the disc within the recorded part c, every time the vertical blanking period recorded part c is reproduced, as shown in FIG. 10. Accordingly, the recorded video signal is reproduced in an order A→A→B→B→C→C→ . . . for every one-field period. A normal reproduced picture is hence obtained.

On the other hand, with respect to the audio signal, the divided audio signal parts are reproduced in an order 1→2→3→4→5→6→ . . . as shown in FIG. 10 for every one-field period, during the normal reproduction mode. Hence, the reproduced divided audio signal parts are obtained in a state where the divided audio signal parts are composed in a time-series manner with the original order, and the audio signal is normally reproduced.

Figure 11:
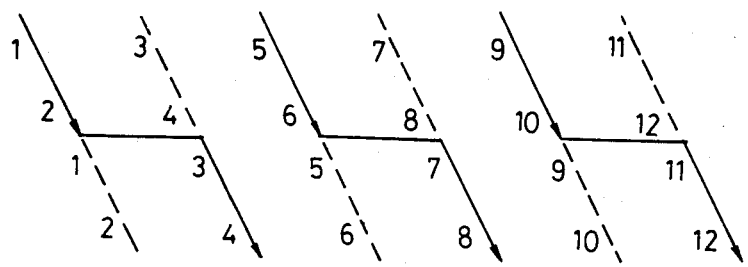
FIGS. 11 and 12 respectively diagrammatically show the relationship between the track tracing locus and the divided audio signal part when normal reproduction is performed with respect to the disc shown in FIG. 4 or FIG. 8.

FIG. 11 diagrammatically shows the reproducing order of the divided audio signal parts, when the disc shown in FIG. 4 is reproduced with the tracing locus indicated by the solid line in FIG. 10. In FIG. 11, as well as FIGS. 12, 14, and 15 which will be described hereinafter, solid lines indicate the tracing locus, and broken lines indicate track parts which are not traced. Sloping lines respectively indicate a track formed for one revolution of the disc. Numbers shown in these figures indicate the original order of the recorded divided audio signal parts, and positions of these numbers indicate recorded positions of the divided audio signal parts on the track. As shown in FIG. 11, the divided audio signal parts are arranged and recorded with the original order 1→2→3→4→ . . . , even on the track parts indicated by the broken lines which are not traced. An audio information different from that recorded on the track parts indicated by the solid lines, can be recorded on the above track parts indicated by the broken lines which are not traced. Moreover, although the reproducing stylus 15 is shifted towards the inner peripheral side of the disc within the vertical blanking period recorded part c in the example shown in FIG. 10, normal reproduction of the audio signal can be performed simultaneously with the reproduction of the video signal even when the shifting position is erroneously deviated by one track and the main track parts indicated by the broken lines in FIGS. 10 and 11 are reproduced.

When the video signal recorded on the disc shown in FIG. 4 is a video signal reproduced from the VTR or picked up by the television camera, comprising odd (or even) number fields and having a field frequency of 50 Hz, the disc is rotated at a rotational speed of 750 rpm as in the above described case. On the other hand, the disc recorded with a video signal reproduced from the VTR or picked up by the television camera comprising odd (or even) number fields and having a field frequency of 60 Hz, or recorded with a video signal from a movie film which is reproduced at a rate of thirty picture frames per second, is rotated at a rotational speed of 900 rpm. A normal reproduced picture can be obtained from these discs based on the 2—2 pull-down system, by generating a kick pulse so that the reproducing stylus traces over the track tracing locus indicated by the solid line in FIGS. 10 and 11. Of course, by repeatedly reproducing the same track for one revolution of period of the disc, a complete and stable still picture can be obtained.

Figure 12:
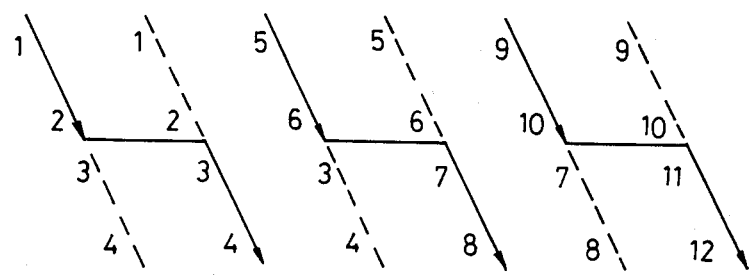

If the divided audio signal parts on the disc shown in FIG. 4 are arranged and recorded in an order shown in FIG. 12, the audio signal can be normally reproduced by tracing over the locus indicated by the solid line in FIG. 12 with the reproducing stylus.

Next, description will be given with respect to the operation of the reproducing apparatus during still picture reproduction and normal reproduction modes, for the case where the disc is the second embodiment of the disc shown in FIG. 6. First, during the still picture reproduction mode, the same picture frame of the movie film is repeatedly reproduced from the video signal recorded on the disc which is rotated at a rotational speed of 900 rpm, by shifting the reproducing stylus 15 towards the outer peripheral side of the disc by one track pitch every time the third reference signal fp3 is reproduced. Hence, a completely still reproduced picture having a field frequency of 60 Hz is obtained. The disc shown in FIG. 8 is similarly reproduced during the still picture reproduction mode.

The disc shown in FIG. 6 is recorded with the video signal from a movie film which is reproduced at a rate of twenty-four picture frames per second, as described above. Thus, in order to perform normal reproduction without introducing time-base deviation so that the video signal recorded on the disc shown in FIG. 6 is reproduced as a video signal having a field frequency of 60 Hz, the video signal corresponding to two picture frames of the above movie film must be reproduced in 1/12 seconds for five-field period. Therefore, reproduction must be performed based on the known 2-3 (or 3-2) pull-down system, so that an operation is alternately and repeatedly performed in which the video signal of one picture frame is reproduced for two-field period and the video signal of a succeeding picture frame is reproduced for three-field period.

Figure 13:
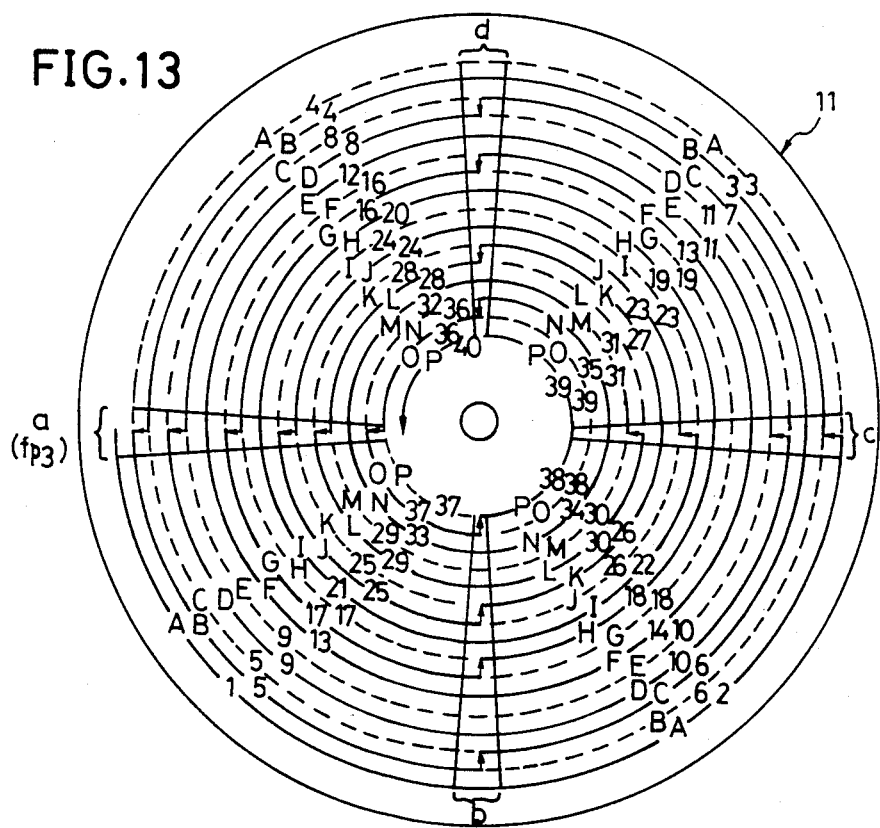
FIG. 13 shows an example of a track tracing locus for a case where normal reproduction is performed with respect to the disc shown in FIG. 6.

In FIGS. 13 and 14, the solid lines indicate the track tracing locus of the reproducing stylus when reproduction of the disc shown in FIG. 6 is performed based on the above 2-3 pull-down system. According to the 2-3 pull-down system, the recorded video signal of one picture frame is successively reproduced in an order A→A→B→B→B→C→C→D→D→D→E→ . . . for every one-field period, as shown in FIG. 13. Thus, a normal reproduced picture is obtained without introducing deviation in the time-base.

On the other hand, with respect to the audio signal, the divided audio signal parts are successively reproduced in a time-series manner with the regular order 1→2→3→4→5→6→7→ . . . as shown by the solid line in FIGS. 13 and 14. Accordingly, the audio signal can be normally reproduced. In FIG. 14, arrows pointing towards the left indicate shifts towards the outer peripheral side of the disc so as to return to the same track. In addition, arrows pointing upwards indicate that no shift is performed, and arrows pointing towards the right indicate shifts towards the inner peripheral side of the disc so as to shift to a succeeding track.

As another method of performing normal reproduction without introducing deviation in the time-base, so that the video signal from a movie film having twenty-four picture frames per second is reproduced as a video signal having a field frequency of 60 Hz, a 2-2-4-3-2-2-4-2-2 pull-down system may be employed. In this case, the manner in which the above shifting is performed is facilitated. FIG. 15 diagrammatically shows the relationship between the tracing locus of the reproducing stylus when reproduction is performed by use of the 2-2-4-2-2-4-2-2 pull-down system, and the recorded divided audio signal parts. As clearly seen from FIG. 15, the direction towards which the reproducing stylus is shifted, is only towards the inner peripheral side of the disc, and the shifting operation is accordingly facilitated. Even if the shifting position shown in FIG. 15 deviates towards the inner or outer peripheral side of the disc by one track, the audio signal can be normally reproduced. However, in order to perform reproduction based on the above 2-2-4-2-2-4-2-2 pull-down system, it is necessary to change the order with which the divided audio signal parts from that indicated in the disc shown in FIG. 6 to the order indicated in brackets in FIG. 6.

During reproduction using the 2-2-4-2-2-4-2-2 pull-down system, the video signal corresponding to eight picture frames of the movie film is reproduced in twenty-field period. Hence, compared to the reproduction using the above described 2-3 pull-down system, the normal reproduced picture is not completely stable. However, the degree of unstableness of the normal reproduced picture is such that no problems are introduced from the practical point of view.

Next, a case will be considered in which the video signal of a movie film recorded on the disc having twenty-four picture frames per second, is normally reproduced as a video signal having a field frequency of 60 Hz. In this case, by always shifting the reproducing stylus towards the inner peripheral side of the disc within the vertical blanking period recorded part c, the recorded video signal is reproduced in an order A→A→B→B→C→C→C→C→D→D→E→ . . . . This reproduction is based on a 2-2-4-2 pull-down system. Hence, normal reproduction is performed so that the recorded video signal of a movie film having twenty-four picture frames per second is reproduced as a video signal having a field frequency of 60 Hz.

In this case, the reproducing stylus traces over a track tracing locus which is the same as that shown in FIG. 10. Accordingly, the manner in which the reproducing stylus is shifted in this case, is even more simplified compared to the above case where the 2-2-4-2-2-4-2-2 pull-down system is used. Moreover, the relationship between the tracing locus of the reproducing stylus and the recorded divided audio signal parts, becomes the same as that shown in FIGS. 11 and 12.

Figure 16:
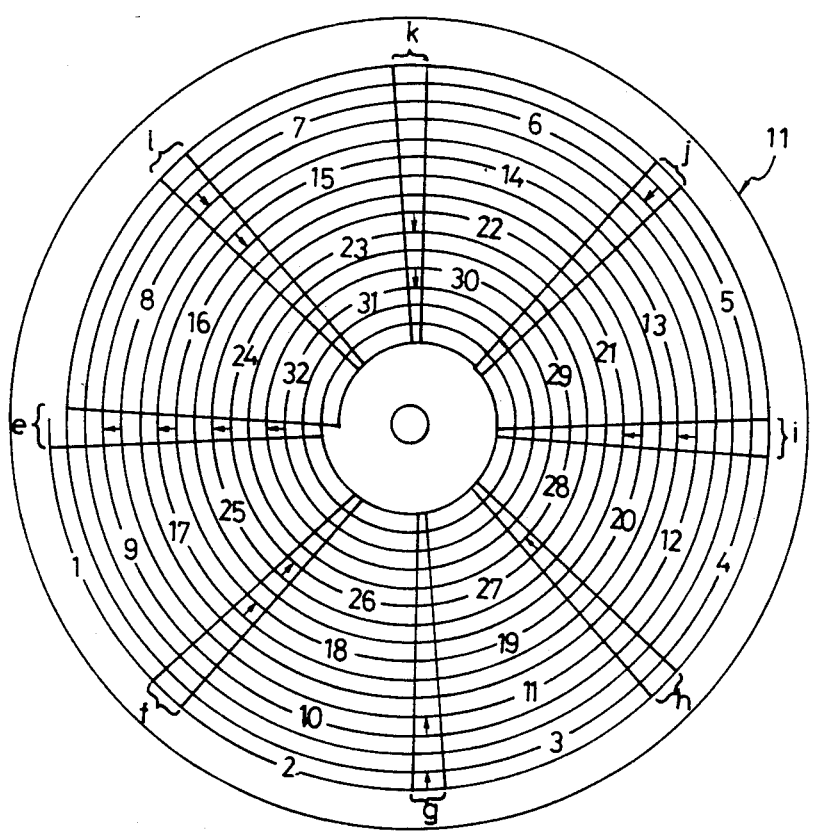
FIG. 16 diagrammatically shows the recorded position, order, and the like of the recorded signal in a fourth embodiment of a disc according to the present invention.

The present invention is not limited to the above described embodiments of the invention. For example, the disc according to the present invention can be applied to a disc recorded with a video signal of eight fields for one revolution period of the disc, a disc recorded with a video signal of over four fields for one revolution period of the disc, and the like. FIG. 16 diagrammatically shows the recorded position, order, and the like of the recorded signal, for a case where the disc according to the present invention is applied to a disc recorded with a video signal of eight fields for one revolution period of the disc. In FIG. 16, e through l respectively indicate the vertical blanking period recorded parts, and the disc is recorded with the same field (or the same picture frame) of the video signal for one revolution period of the disc. Numbers indicated in FIG. 16 indicate the divided order of the divided audio signal parts which are divided in units of field periods. The positions where these numbers are shown, indicate the field period part where the divided audio signal part of that divided order is recorded. Further, arrows in FIG. 16 indicate the shifting positions and the shifting directions of the reproducing stylus.

The reproducing stylus 15 traces over the disc counterclockwise in FIG. 16. The normal reproduction is performed by shifting the reproducing stylus 15 towards directions of the arrows. Moreover, a completely still picture can be obtained, by repeatedly reproducing the same track.

Generally, the audio signal recorded onto the disc comprises two or more channels. On the other hand, with respect to the picture information, the same field (or the same picture frame) of the video signal is recorded for one revolution period of the disc. Hence, the picture information of one hour is reproduced in thirty minutes during normal reproduction of the disc using the 2—2 pull-down system or the 2-2-4-2 pull-down system. This means that the disc for performing normal reproduction using the 2-3 pull-down system or the 2-2-4-2-2-4-2-2 pull-down system, is reproduced in thirty-seven minutes and thirty seconds.

If the above kind of disc according to the present invention is reproduced by a conventional disc reproducing apparatus which does not shift the reproducing stylus, a ½-speed slow-motion reproduction or a ⅖-speed slow-motion reproduction is performed when the conventional normal reproducing operation is performed. The slow-motion reproduced picture will be obtained in a normal manner for these cases, however, the audio signal will not be reproduced in a normal manner.

Accordingly, in another embodiment of a disc according to the present invention, one channel out of a plurality of audio channels is recorded with an audio signal so that this audio signal is normally reproduced, when reproduction is performed without shifting the reproducing stylus. The other audio channels are respectively recorded with the divided audio signal parts which are arranged in a predetermined order, as described above.

By use of this disc, the slow-motion reproduced picture and the normally reproduced audio signal can both be obtained, even when the disc is reproduced without shifting the reproducing stylus (conventional normal reproduction) by the conventional reproducing apparatus. In the reproducing apparatus for reproducing the disc according to the present invention, the audio signal can be normally reproduced during the normal reproduction or during the reproduction in which the reproducing stylus is not shifted, according to the selection made by the operator.

In the above case, the audio program content can be the same in each of the audio channels. Since the total reproducing time differs as described above, a detailed commentary can be recorded on the audio channel which is reproduced upon slow-motion reproduction, and a on-the-spot audio signal and the like can be recorded on the audio channel which is reproduced upon normal reproduction, for example. A program of such a system can be recorded at an intermediate part on one side of the disc, for example. In this case, a slow-motion reproduction is performed with respect to this program part, in a reproducing apparatus which does not employ the disc according to the present invention. However, in such an apparatus, the audio signal is reproduced in the same manner as the normal programs preceeding and succeeding this program part (it is necessary to record the audio signal in the main channel). In the reproducing apparatus for reproducing the disc according to the present invention, there is an advantage in that normal reproduction and slow-motion reproduction can be performed with respect to the above program part, according to the selection made by the operator.

Further, the present invention is not limited to these embodiments, but various variations and modifications may be made without departing from the scope of the present invention.

What is claimed is:

1. A rotary recording medium having a spiral track formed on a recording surface thereof, said spiral track having both video and audio signals recorded thereon, said signals being selectively transformed from a source of material on which mutually corresponding original picture and sound information streams are laid out, said spiral track being made up of a plurality of consecutive track turns each turn having four sectors, each of said track turns having recorded thereon one field of the video signal which is repeatedly and identically recorded four times, said audio signal being made up of a plurality of divided signal segments, each of said divided signal segments being recorded on one track turn extending over one of said four sectors, a continuous stream of audio signals transformed from the original sound information stream, said stream of signals being constituted by two consecutive divided signal segments extending into the first and second sectors on a (2n+1)-th track turn and subsequently by two consecutive divided signal segments extending into the third and fourth sectors on a (2n+2)-th track turn, where n=0, 1, 2, 3, ..., and a stream of video signals transformed from the original picture information stream and recorded as fields of the video signal on the track parts which said continuous audio stream occupies, the picture motion in the picture information stream being substantially the same as an original picture motion of the original picture information stream in said source material.

2. A rotary recording medium as claimed in claim 1 in which said source material is a movie film having twenty-four picture frames per second together with a sound track forming said sound information stream, said video and audio signals are a transformation of said movie film so that one field of the video signal corresponds to one picture frame of the movie film, said two consecutive divided signal elements of said audio signal extending into the first and second sectors of a track turn being repeatedly and respectively recorded on the same track turn in the third and fourth sectors, and said video signal has a field frequency of 50 Hz.

3. A rotary recording medium as claimed in claim 1 in which said source material is a movie film having thirty picture frames per second together with a sound track forming said sound information stream, said video and audio signals are a transformation of said movie film so that one field of the video signal corresponds to one picture frame of the movie film, said two consecutive divided signal elements of said audio signal extending into the first and second sectors of a track turn being repeatedly and respectively recorded on the same track turn in the third and fourth sectors, and said video signal has a field frequency of 60 Hz.

4. A rotary recording medium as claimed in claim 1 in which said source material is a video tape having a standard television signal recorded thereon with a field frequency of 50 Hz and including audio information as said sound information stream, said video and audio signals are a transformation of said standard television signal so that fields of the video signal correspond to only odd or even fields of the standard television signal, said two consecutive divided signal elements of said audio signal extending into the first and second sectors of a track turn being repeatedly and respectively recorded on the same track turn in the third and fourth sectors, and said video signal has a field frequency of 50 Hz.

5. A rotary recording medium as claimed in claim 1 in which said source material is a video tape having a standard television signal recorded thereon with a field frequency of 60 Hz and including audio information as said sound information stream, said video and audio signals are a transformation of said standard television signals so that fields of the video signal correspond to only odd or even fields of the standard television signal, said two consecutive divided signal elements of said audio signal extending into the first and second sectors of a track turn being repeatedly and respectively recorded on the same track turn in the third and fouth sectors, and said video signal has a field frequency of 60 Hz.

6. A rotary recording medium having a spiral track formed on a recording surface thereof, said spiral track having video and audio signals recorded thereon, said signals being respectively transformed from a source material on which a mutually corresponding original picture and a stream of sound information signals are laid out, said source material being a movie film having twenty-four picture frames per second together with a sound track having said stream of sound information, said video and audio signals being a transformation of said movie film so that one field of the video signal corresponds to one picture frame of the movie film and so that the video signal has a field frequency of 60 Hz, said spiral track being made up of a plurality of consecutive track turns divided into four sectors, each track turn having one field of the video signal repeatedly and identically recorded thereon four times, said audio signal being made up of a plurality of divided signal segments, each divided signal segment being recorded on one track turn over one of the four sectors, a continuous stream of audio signals transformed from the original stream of sound information being constituted by divided signal segments recorded in track parts $t1_{s1}$, $t1_{s2}$, $t2_{s3}$, $t2_{s4}$, $t2_{s1}$, $t3_{s2}$, $t3_{s3}$, $t4_{s4}$, $t4_{s1}$, $t4_{s2}$, $t5_{s3}$, $t5_{s4}$, $t6_{s1}$, $t6_{s2}$, $t6_{s3}$, $t7_{s4}$, ..., where a track part $ti_{sj}$ represents a part of the i-th track turn within the j-th sector, and a video stream transformed from the original picture information stream being constituted by fields of the video signal recorded on the track parts which said continuous audio stream occupies, the picture motion in the video stream being substantially the same as the motion in an original picture information stream on said movie film.

7. A rotary recording medium having a spiral track formed on a recording surface thereof, said spiral track having video and audio signal recorded thereon which are respectively transformed from a source material on which mutually corresponding original picture and a stream of sound information signals are laid out, said source material being a movie film having twenty-four picture frames per second together with said stream of sound information signals, said video and audio signals being a transformation of said movie film so that one field of the video signal corresponds to one picture frame of the movie film and so that the video signal has a field frequency of 60 Hz, said spiral track being made up of a plurality of consecutive track turns having four sectors, each track turn having one field of the video signal repeatedly and identically recorded thereon four times, said audio signal being made up of a plurality of divided signal segments, each divided signal segment being recorded on one track turn over one of said sectors, a continuous stream of audio signals transformed from the original sound information stream and being constituted by divided signal segments recorded in track parts $t1_{s1}$, $t1_{s2}$, $t2_{s3}$, $t2_{s4}$, $t3_{s1}$, $t3_{s2}$, $t3_{s3}$, $t3_{s4}$, $t4_{s1}$, $t4_{s2}$, $t5_{s3}$, $t5_{s4}$, $t6_{s2}$, $t6_{s3}$, $t6_{s4}$, ... c where a track part $ti_{sj}$ represents a part of the i-th track turn within the j-th sector, and a video stream transformed from the original picture information stream being constituted by fields of the video signal recorded on the track parts which said continuous audio stream occupies, picture motion in said video stream being substantially the same picture motion in the original picture information stream on said movie film.

8. A rotary recording medium having a spiral track formed on a recording surface thereof, said spiral track having video and audio signals recorded thereon, said signals being transformed from a source material on which mutually corresponding original picture and a stream of sound information signals are laid out, said source material being a movie film having twenty-four picture frames per second together with said stream of sound information signals, said video and audio signals being a transformation of said movie film so that one field of the video signal corresponds to one picture frame of the movie film, and so that the video signal has a field frequency of 60 Hz, said spiral track being made up of a plurality of consecutive track turns, each of said track turns having four sectors, each of said track turns having one field of the video signal identically recorded thereon four times, said audio signal being made up of a plurality of divided signal segments, each divided signal segment being recorded on one track turn over one of the four sectors, a continuous stream of audio signals transformed from the original stream of sound information signals being constituted by two consecutive divided signal segments extending into the first and second sectors on a $(2n+1)$-th track turn and two consecutive divided signal segments extending into the third and fourth sectors on a $(2n+2)$-th track turn, where $n=0, 1, 2, 3, \ldots$, a video stream transformed from the original picture information stream being constituted by fields of the video signal recorded on the track parts which said continuous audio stream occupies, pictures motion in said video stream being substantially the same as the motion in the original picture information source on said movie film, a $(5m-2)$-th track turn and a sebsequent $(5m-1)$-th track turn repeatedly containing said identical field of the video signal, where $m=1, 2, 3, \ldots$ 9. A reproducing apparatus for playing a rotary recording medium having a spiral track formed on a recording surface thereof, said spiral track having video and audio signals recorded thereon, said recorded signals being selectively transformed from a source material on which mutually corresponding original picture and a stream of sound information signals are laid out, said spiral track being made up of a plurality of consecutive track turns, each turn having four sectors, each track turn having one field of the video signal which is repeatedly and identically recorded four times, said audio signal being made up of a plurality of divided signal segments, each divided signal segment being recorded on one track turn over one of said sectors, a continuous stream of audio signals transformed from the original stream of sound information signals being constituted by two consecutive divided signal segments extending into the first and second sectors on a $(2n+1)$-th track turn and subsequently by two consecutive divided signal segments extending into the third and fourth sectors on a $(2n+2)$-th track turn, where $n=0, 1, 2, 3, \ldots$, a stream of video signals transformed from the original picture information stream being constituted by fields of the video signal recorded on the track parts which said continuous audio stream occupies, picture motion in said stream of video signals being substantially the same as the picture motion in the original picture information stream on said source material, said reproducing apparatus comprising:

means for rotating said recording medium at a predetermined rotational speed;

means including a reproducing element for picking up and reproducing signals from the rotating rotary recording medium;

means for kicking said reproducing element to an adjacent track responsive to a kick signal; and kick signal generating means for generating said kick signal responsive to an external mode signal and to a discrimination signal which is indicative of a type of said rotary recording medium, said kicking means moving said reproducing element to an adjacent track in an outer peripheral direction of said recording medium, said outer movement being carried out within a first duration corresponding to a predetermined vertical blanking period of the video signal when a still picture reproduction mode signal is being supplied to said kick signal generating means, so that a still picture is reproduced by the repeated scanning of the same track turn, said first duration occuring when said reproducing element is reading a location between said first and fourth sectors, said kicking means moving said reproducing element to an adjacent track in an inner peripheral direction of said recording medium, said inner movement being carried out within a second duration corresponding to a vertical blanking period other than said predetermined vertical blanking period of the video signal when a normal reproduction mode signal is being supplied to said kick signal generating means, so that said video stream is reproduced together with said continuous stream of audio signals by scanning over the (2n+1)-th track turn within the first and second sectors and the (2n+2)-th track turn within the third and fourth sectors, said second duration occurring when said reproducing element is reading a location between second and third sectors.

10. A reproducing apparatus for playing a rotary recording medium having a spiral track formed on a recording surface thereof, said spiral track having video and audio signals recorded thereon, said signals being transformed from a source material on which original picture and sound information streams are laid out, said source material being a movie film having twenty-four picture frames per second together with a stream of said sound information signals, said video and audio signals being a transformation of said movie film so that one field of the video signal corresponds to one picture frame of the movie film and so that the video signal has a field frequency of 60 Hz, said spiral track being made up of a plurality of consecutive track turns, each of said track turns having four sectors, each track turn having one field of the video signal repeatedly and identically recorded thereon four times, said audio signal being made up of divided signal segments, each divided signal segment being recorded on one track turn over one of said sectors, a continuous stream of audio signals transformed from the original sound information stream being constituted by divided signal segments recorded in track parts $t1_{s1}$, $t1_{s2}$, $t2_{s3}$, $t2_{s4}$, $t2_{s1}$, $t3_{s2}$, $t3_{s3}$, $t4_{s4}$, $t4_{s1}$, $t4_{s2}$, $t5_{s3}$, $t5_{s4}$, $t6_{s1}$, $t6_{s2}$, $t6_{s3}$, $t7_{s4}$, . . . , where a track part $ti_{sj}$ represents a part of the i-th track turn within the j-th sector, a stream of video signals transformed from the original picture information stream being constituted by fields of the video signal recorded on the track parts which contain said continuous stream of audio signals, picture motion being substantially the same in said video signals as in the original stream of picture information on said movie film, said reproducing apparatus comprising:

means for rotating said recording medium at a rotational speed of 900 rpm;

means including a reproducing element for picking up and reproducing recorded signals from the rotating rotary recording medium;

means for kicking said reproducing element to an adjacent track responsive to a kick signal; and means for generating said kick signal responsive to an external mode signal and to a discrimination signal which is indicative of a type of said rotary recording medium, said kicking means moving said reproducing element to an adjacent track with motion in an outer peripheral direction of said recording medium, said kick signal being generated within a specific duration corresponding to a predetermined vertical blanding period of the video signal when a still picture reproduction mode signal is being supplied to said kick signal generating means, so that a still picture is reproduced by the repeated scanning of the same track turn, said specific duration occurring when said reproducing element is located between said first and fourth sectors, said kicking means moving said reproducing element to an adjacent track with motion in inner or outer peripheral directions of said rotary recording medium, said kick signals being generated within durations corresponding to vertical blanking periods of the video signal when said normal reproduction mode signal is being supplied to said kick signal generating means so that said video stream is reproduced together with said continuous stream of audio signals by scanning over the track parts in a sequence $t1_{s1}$, $t1_{s2}$, $t2_{s3}$, $t2_{s4}$, $t2_{s1}$, $t3_{s2}$, $t3_{s3}$, $t4_{s4}$, $t4_{s1}$, $t4_{s2}$, $t5_{s3}$, $t5_{s4}$, $t6_{s1}$, $t6_{s2}$, $t6_{s3}$, $t7_{s4}$, . . . .

11. A reproducing apparatus for playing a rotary recording medium having a spiral track formed on a recording surface thereof, said spiral track having video and audio signals recorded thereon and being transformed from a source material on which original picture and sound information streams are laid out, said source material being a movie film having twenty-four picture frames per second together with a sound track containing a stream of said sound in formation signals, said video and audio signals being a transformation of saidmovie film so that one field of the video signal corresponds to one picture frame of the movie film and so that the video signal has a field frequency of 60 Hz, said spiral track being made up of a plurality of consecutive track turns each having four sectors, each track turn having one field of the video signal repeatedly and identically recorded thereon four times, said audio signal being made up of a plurality of divided signal segments, each divided signal segment being recorded on one track turn over one of said sectors, a continuous stream of audio signals transformed from the original sound information stream and being constituted by divided signal segments recorded in track parts $t1_{s1}$, $t1_{s2}$, $t2_{s3}$, $t2_{s4}$, $t3_{s1}$, $t3_{s2}$, $t3_{s3}$, $t3_{s4}$, $t4_{s1}$, $t4_{s2}$, $t5_{s3}$, $t5_{s4}$, $t6_{s1}$, $t6_{s2}$, $t6_{s3}$, $t6_{s4}$, . . . , where a track part $ti_{sj}$ represents a part of the i-th track turn within the j-th sector, a stream of video signals being transformed from the original picture information stream being constituted by fields of the video signal recorded on the track parts which said continuous audio stream occupies, picture motion being substantially the same in the video signals as in the original stream of picture information on said movie film, said reproducing apparatus comprising:

means for rotating said recording medium at a rotational speed of 900 rpm;

means including a reproducing element for picking up and reproducing recorded signals from the rotary recording medium;

means for kicking said reproducing element to an adjacent track responsive to a kick signal; and means for generating said kick signal responsive to an external mode signal and to a discrimination signal indicative of a type of said rotary recording medium, said kicking means moving said reproducing element to an adjacent track with motion in an outer peripheral direction of said rotary recording medium, said kick signal occurring within a specific duration corresponding to a predetermined vertical blanking period of the video signal when a still picture reproduction mode signal is being supplied to said kick signal generating means, so that a still picture is reproduced by the repeated scanning of the same track turn, said specific duration occurring when said reproducing element is located between said first and fourth sectors, said kicking means moving said reproducing element to an adjacent track with motion in an inner peripheral direction of said rotary recording medium, said kick signals occurring within durations corresponding to vertical blanking periods of the video signal when said normal reproduction mode signal is being supplied to said kick signal generating means so that said video stream is reproduced together with said continuous audio stream by scanning over the track parts in a sequence $t1_{s1}$, $t1_{s2}$, $t2_{s3}$, $t2_{s4}$, $t3_{s1}$, $t3_{s2}$, $t3_{s3}$, $t3_{s4}$, $t4_{s1}$, $t4_{s2}$, $t5_{s3}$, $t5_{s4}$, $t6_{s1}$, $t6_{s2}$, $t6_{s3}$, $t6_{s4}$, . . . .

* * * * *

UNITED STATES PATENT AND TRADEMARK OFFICE
CERTIFICATE OF CORRECTION

PATENT NO. : 4,490,752

DATED : December 25, 1984

INVENTOR(S) : TOYOTAKA MACHIDA, ET AL.

It is certified that error appears in the above-identified patent and that said Letters Patent is hereby corrected as shown below:

Claim 7, Column 15, line 60, between "$t5_{s4}$" and "$t6_{s2}$" insert --$t6_{s1}$--; change "c" to -- , -- (a comma);

Column 15, line 66, after "same" insert --as--.

Claim 8, Column 16, line 30, change "pictures" to --picture--;

Column 16, line 33, change "sebse-" to --subse- --.

Claim 10, Column 17, line 55, between "of" and "divided" insert --a plurality of--;

Column 18, line 19, change "blanding" to --blanking--.

Claim 11, Column 18, line 46, change "in formation" to --information--;

Column 18, line 48, change "saidmovie" to --said movie--.

Signed and Sealed this

Tenth Day of September 1985

[SEAL]

Attest:

DONALD J. QUIGG

Attesting Officer     Acting Commissioner of Patents and Trademarks - Designate